United States Patent
Danley et al.

(10) Patent No.: US 9,529,162 B2
(45) Date of Patent: Dec. 27, 2016

(54) OPTICAL FIBER CONNECTORS AND METHODS OF FORMING OPTICAL FIBER CONNECTORS

(71) Applicants: Jeffrey D. Danley, Hickory, NC (US); Robert B. Elkins, II, Hickory, NC (US); Kevin B. Sparks, Hickory, NC (US)

(72) Inventors: Jeffrey D. Danley, Hickory, NC (US); Robert B. Elkins, II, Hickory, NC (US); Kevin B. Sparks, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 13/647,539

(22) Filed: Oct. 9, 2012

(65) Prior Publication Data
US 2014/0099060 A1    Apr. 10, 2014

(51) Int. Cl.
*G02B 6/30* (2006.01)
*B23P 11/00* (2006.01)
*G02B 6/42* (2006.01)

(52) U.S. Cl.
CPC .......... *G02B 6/4214* (2013.01); *G02B 6/4292* (2013.01); *G02B 6/425* (2013.01); *Y10T 29/49895* (2015.01)

(58) Field of Classification Search
CPC ..................................... G02B 6/26; G02B 6/30
USPC ...................................................... 385/38, 16
See application file for complete search history.

(56) References Cited

U.S. PATENT DOCUMENTS

| | | | | |
|---|---|---|---|---|
| 4,411,519 A | * | 10/1983 | Tagami | 356/45 |
| 4,458,985 A | | 7/1984 | Balliet et al. | |
| 5,155,784 A | | 10/1992 | Knott | 385/88 |
| 5,163,113 A | * | 11/1992 | Melman | 385/31 |
| 5,263,111 A | * | 11/1993 | Nurse et al. | 385/130 |
| 5,418,875 A | | 5/1995 | Nakano et al. | 385/77 |
| 5,761,350 A | * | 6/1998 | Koh | 385/14 |
| 6,208,791 B1 | * | 3/2001 | Bischel et al. | 385/129 |
| 6,217,230 B1 | | 4/2001 | Matsushita | 385/78 |
| 6,419,399 B1 | | 7/2002 | Loder et al. | 385/53 |
| 6,457,875 B1 | | 10/2002 | Kropp et al. | 385/89 |
| 6,539,143 B1 | * | 3/2003 | Hunter | 385/19 |

(Continued)

FOREIGN PATENT DOCUMENTS

| | | |
|---|---|---|
| CN | 101176024 | 10/2010 |
| CN | 101521194 | 6/2011 |

(Continued)

OTHER PUBLICATIONS

EP Search Report issued in corresponding EP Application No. 13776692.9, dated May 21, 2015.

(Continued)

*Primary Examiner* — Kaveh C Kianni

(57) ABSTRACT

An optical fiber connector includes a fiber alignment body including a continuous optical fiber guide channel extending therethrough. The continuous optical fiber guide channel has a lead-in channel portion, a lead-out channel portion and a turn portion that connects the lead-in channel portion and the lead-out channel portion. The fiber alignment body has a reflective surface formed of metal that receives light traveling from an optical fiber located within the lead-in channel portion of the continuous optical fiber channel and reflects the light into the lead-out channel portion of the continuous optical fiber channel.

18 Claims, 9 Drawing Sheets

(56) References Cited

U.S. PATENT DOCUMENTS

| | | | |
|---|---|---|---|
| 6,556,734 B1* | 4/2003 | Bischel et al. | 385/14 |
| 6,602,427 B1* | 8/2003 | Tu | 216/2 |
| 6,655,853 B1* | 12/2003 | Yap et al. | 385/88 |
| 6,684,007 B2* | 1/2004 | Yoshimura et al. | 385/31 |
| 6,690,845 B1* | 2/2004 | Yoshimura et al. | 385/14 |
| 6,706,546 B2* | 3/2004 | Yoshimura et al. | 438/31 |
| 6,785,447 B2* | 8/2004 | Yoshimura et al. | 385/42 |
| 6,874,950 B2 | 4/2005 | Colgan et al. | 385/88 |
| 6,888,988 B2 | 5/2005 | Vancoille et al. | 385/47 |
| 6,912,332 B2* | 6/2005 | Han et al. | 385/14 |
| 7,016,569 B2* | 3/2006 | Mule et al. | 385/37 |
| 7,139,448 B2* | 11/2006 | Jain et al. | 385/14 |
| 7,248,768 B2* | 7/2007 | Jeon et al. | 385/47 |
| 7,362,934 B2* | 4/2008 | Hamano | 385/49 |
| 7,366,428 B2* | 4/2008 | Kuhara et al. | 398/202 |
| 7,572,071 B1 | 8/2009 | Wu | 385/94 |
| 7,670,063 B2 | 3/2010 | Ice | 385/92 |
| 7,703,993 B1* | 4/2010 | Darbinyan et al. | 385/92 |
| 7,802,927 B2 | 9/2010 | Benjamin et al. | 385/88 |
| 7,876,984 B2* | 1/2011 | Matsuoka | 385/14 |
| 8,317,411 B2 | 11/2012 | Fujiwara et al. | |
| 8,386,023 B2* | 2/2013 | Furnish | 600/478 |
| 8,523,458 B2 | 9/2013 | Cody et al. | |
| 8,620,122 B2 | 12/2013 | Meadowcroft et al. | |
| 2001/0041030 A1 | 11/2001 | Chen et al. | 385/88 |
| 2002/0097962 A1* | 7/2002 | Yoshimura et al. | 385/50 |
| 2003/0090756 A1* | 5/2003 | Moon et al. | 359/110 |
| 2004/0005119 A1* | 1/2004 | Han et al. | 385/49 |
| 2004/0071387 A1* | 4/2004 | Mule et al. | 385/14 |
| 2004/0197046 A1 | 10/2004 | Drost et al. | 385/14 |
| 2004/0234210 A1 | 11/2004 | Nagasaka et al. | 385/88 |
| 2005/0082524 A1* | 4/2005 | Kuhara et al. | 257/40 |
| 2005/0111781 A1* | 5/2005 | Jain et al. | 385/15 |
| 2005/0238294 A1 | 10/2005 | Nagasaka et al. | 385/88 |
| 2006/0039655 A1 | 2/2006 | Wilson | 385/79 |
| 2006/0215963 A1* | 9/2006 | Hamano | 385/49 |
| 2007/0041009 A1* | 2/2007 | Iwano et al. | 356/246 |
| 2007/0077008 A1* | 4/2007 | Jeon et al. | 385/49 |
| 2007/0097491 A1* | 5/2007 | Jenkins et al. | 359/337.4 |
| 2007/0183724 A1* | 8/2007 | Sato | 385/89 |
| 2008/0166094 A1 | 7/2008 | Bookbinder et al. | |
| 2008/0226228 A1 | 9/2008 | Tamura et al. | 385/33 |
| 2009/0169163 A1 | 7/2009 | Abbott, III et al. | |
| 2009/0182911 A1 | 7/2009 | Krasner et al. | 710/63 |
| 2009/0297095 A1* | 12/2009 | Matsuoka | 385/14 |
| 2009/0297099 A1 | 12/2009 | Benjamin et al. | 385/32 |
| 2010/0151614 A1* | 6/2010 | Darbinyan et al. | 438/65 |
| 2010/0178006 A1* | 7/2010 | Nishimura et al. | 385/55 |
| 2010/0284651 A1 | 11/2010 | Krähenbühl et al. | 385/35 |
| 2011/0123144 A1 | 5/2011 | Wang et al. | 385/14 |
| 2013/0034325 A1 | 2/2013 | Bowen | 385/14 |
| 2013/0177274 A1* | 7/2013 | Kosenko et al. | 385/14 |

FOREIGN PATENT DOCUMENTS

| | | | |
|---|---|---|---|
| CN | 102590959 | 7/2012 | |
| CN | 102621641 | 8/2012 | |
| CN | 102401938 | 7/2014 | |
| DE | 4008483 A1 | 9/1991 | G02B 6/26 |
| EP | 0077478 A2 | 4/1983 | G02B 7/26 |
| EP | 1199587 A1 | 4/2002 | G02B 6/38 |
| EP | 1884810 A1 | 2/2008 | G02B 6/42 |
| JP | 2007334166 A * | 12/2007 | |
| JP | 2008122742 A * | 5/2008 | |
| JP | 2008122743 A * | 5/2008 | |
| WO | WO 85/00899 | 2/1985 | G02B 7/26 |
| WO | WO 2006/088859 A2 | 8/2006 | G02B 6/36 |
| WO | WO 2011/1298183 A1 | 10/2011 | G02B 6/42 |

OTHER PUBLICATIONS

Patent Cooperation Treaty International Search Report and Written Opinion for International Application No. PCT/US2013/063378; mailing date Dec. 2, 2013—9 pages.

W. Yang and A. Gopinath, "Design of Planar Optical Waveguide Corners with Turning Mirrors," in Integrated Photonics Research, vol. 6 of 1996 OSA Technical Digest Series (Optical Society of America, 1996), paper IMD1.

CN2013800569675 First Search Report Dated March 28, 2016.

* cited by examiner

OPTICAL FIBER CONNECTORS AND METHODS OF FORMING OPTICAL FIBER CONNECTORS

FIELD

The present specification relates generally to optical fiber connectors and methods of forming optical fiber connectors.

BACKGROUND

Optical fiber connectors are used in a variety of applications where one or more optical fibers of a set of optical fibers are connected to another set of one or more optical fibers, a circuit board, or other devices. For example, optical fiber cables require connectors adapted to connect to and link discrete segments of optical fibers.

Certain optical and electrical-optical devices have circuit boards that need to be interfaced with one or more optical fibers so that optical signals can be received and processed by the device, and also transmitted from the device to another device or to a back plane. This often requires plug-in or receptacle optical connectors. Alternatively, such an interface may be accomplished with a connector end adapted to be permanently (or semi-permanently) fixed to the circuit board to establish and maintain optical communication with corresponding devices (e.g., photodetector or phototransmitters) on the circuit board. Because interior space is typically at a premium for most optical and electrical-optical devices, the optical connectors are often compact so that they can fit into tight spaces when connecting to a circuit board housed within the device. The fact that space is also at a premium on the circuit board makes establishing the circuit-board optical interconnection even more challenging.

Most optical fiber connectors and the optical fibers connected thereto do not allow for readily accessing and connecting to a circuit board housed in the tight confines of most optical and opto-electronic devices because connection requires introducing significant bending loss in the optical fibers. This is particularly true where the connection needs to be formed at a right angle with a sufficiently tight radius, either in plane or out of plane, while maintaining both low loss and high reliability.

SUMMARY

In one embodiment, an optical fiber connector includes a fiber alignment body including a continuous optical fiber guide channel extending therethrough. The continuous optical fiber guide channel has a lead-in channel portion, a lead-out channel portion and a turn portion that connects the lead-in channel portion and the lead-out channel portion. The fiber alignment body has a reflective surface formed of metal that receives light traveling from an optical fiber located within the lead-in channel portion of the continuous optical fiber channel and reflects the light into the lead-out channel portion of the continuous optical fiber channel.

In another embodiment, a method of forming an optical fiber connector is provided. The method includes providing at least one optical fiber and holding the at least one optical fiber within an optical fiber guide channel of a fiber alignment body. The optical fiber guide channel has a lead-in channel portion receiving the optical fiber, a lead-out channel portion and a turn portion that connects the lead-in channel portion and the lead-out channel portion. The fiber alignment body has a reflective surface that receives light traveling from the optical fiber located within the lead-in channel portion of the optical fiber channel and reflects the light into the lead-out channel portion of the optical fiber channel.

In another embodiment, an optical fiber connector includes a first fiber alignment member having a lead-in channel surface, a lead-out channel surface and the reflective surface that extends at an angle to the lead-in channel surface. A second fiber alignment member includes a lead-in channel surface and a lead out channel surface. The first fiber alignment member is connected to the second fiber alignment member along a parting region such that the lead-in channel surfaces of the first fiber alignment member and the second fiber alignment member cooperate to form a lead-in channel portion of an optical fiber guide channel and the lead-out channel surfaces of the first fiber alignment member and the second fiber alignment member cooperate to form a lead-out channel portion of the optical fiber guide channel.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments described herein generally relate to optical fiber connectors and methods of forming optical fiber connectors. The optical fiber connectors include a fiber alignment body that includes an optical fiber guide channel that can retain an optical fiber and be used to guide light traveling from the optical fiber along a bent path for receipt by an opto-electronic device. The optical fiber connectors may be formed of multiple fiber alignment members, such as a first fiber alignment member and a second fiber alignment member that meet along a parting region that intersects the optical fiber guide channel to facilitate formation of the optical fiber connectors and positioning of the optical fiber within the optical fiber guide channel. In other embodiments, the optical fiber connectors may be formed of a single fiber alignment member.

Figure 1:
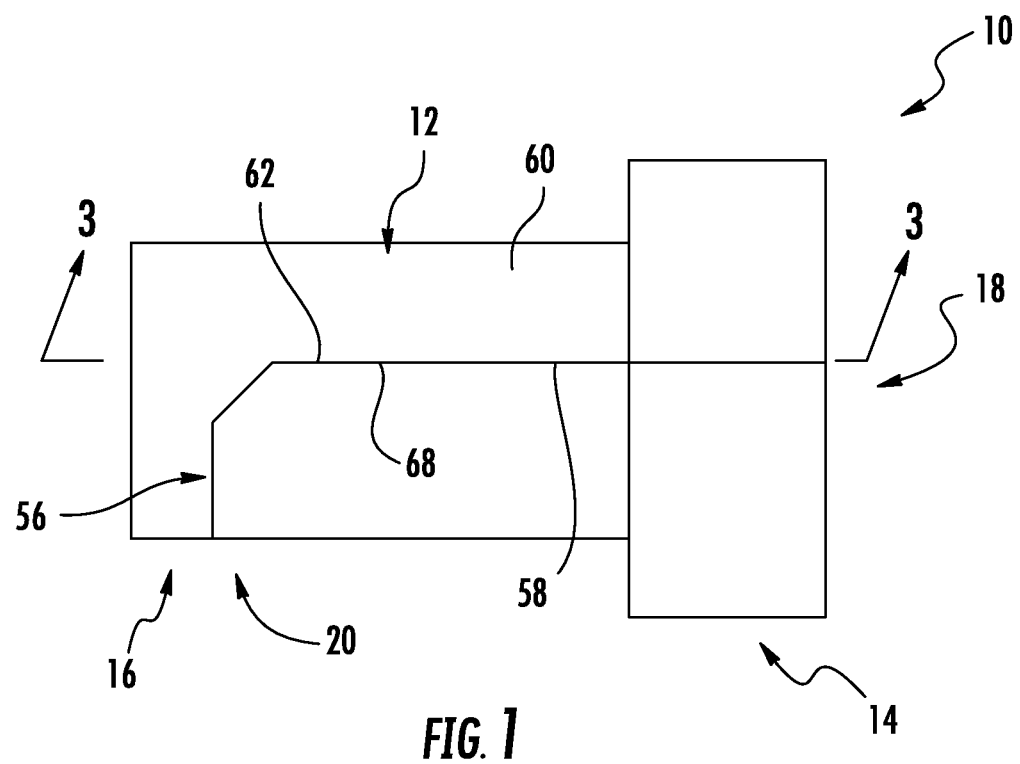
FIG. 1 is a side view of an embodiment of an optical fiber connector.
Figure 2:
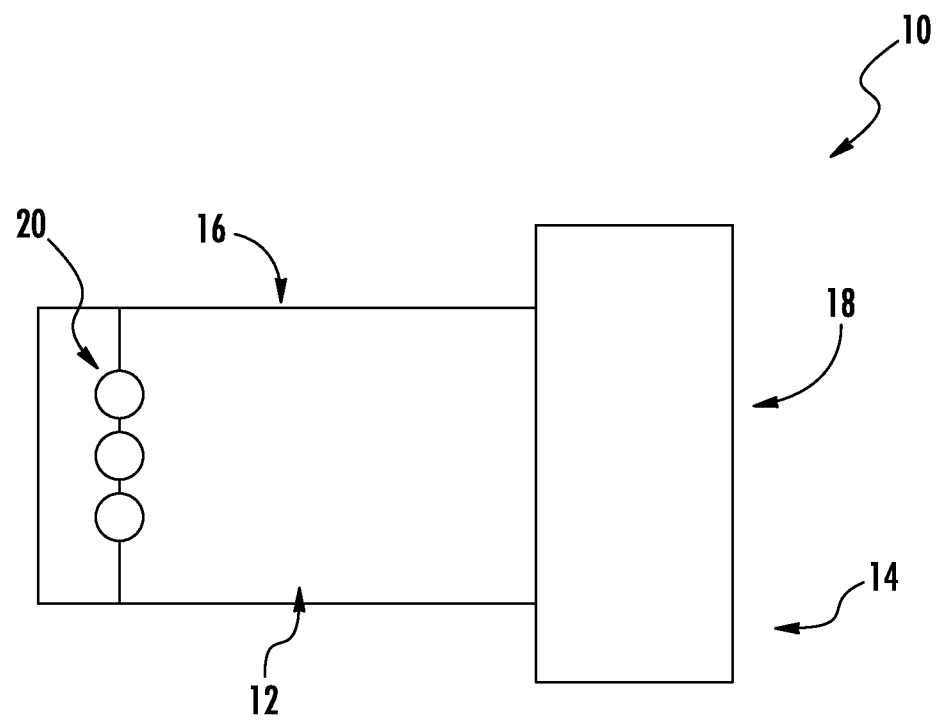
FIG. 2 is a bottom view of the optical fiber connector of FIG. 1.

Referring to FIGS. 1 and 2, an optical fiber connector 10 includes a fiber alignment body 12 having a larger dimension portion 14 and a smaller dimension portion 16. In some embodiments, the smaller dimension portion 16 is sized and configured to be received within a mating connector or receptacle and the larger dimension portion 14 may serve as a stop or alignment feature that can aid in alignment and prevent over insertion of the smaller dimension portion 16 into the mating connector or receptacle. A first input/output (I/O) end 18 is located at the larger dimension portion 14 and a second I/O end 20 is located at the smaller dimension portion 16. In some embodiments, the first and second I/O ends 18 and 20 lie in substantially orthogonal planes, as shown, but other orientations are possible depending, for example, on the orientation and location of an opto-electric device, such as an optical transmitter (e.g., an optical transmitter array, broad-area emitter, etc.) or an optical detector (e.g., an optical detector array, broad-area detector, vertical cavity surface-emitting laser (VCSEL), LED, etc.) within an opto-electric assembly.

Figure 3:
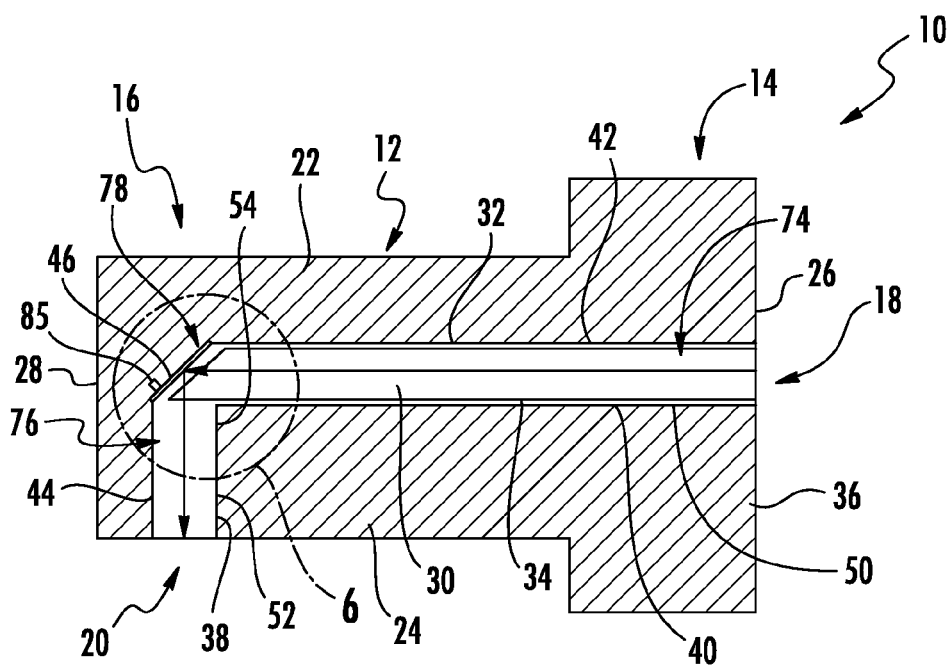
FIG. 3 is a section view along line 3-3 of the optical fiber connector of FIG. 1.

Referring to FIG. 3, the optical fiber connector 10 may include one or more optical fibers 30, such as one or more nanostructured optical fibers or other types of optical fibers including bend performance optical fibers, all referred to herein as "optical fibers." In the illustrated embodiment, three optical fibers 30 are illustrated, however, less or more than three optical fibers 30 may be used. The optical fibers 30 can be single mode or multi-mode. Fiber cladding diameters can be, for example, 125 µm, 80 µm or some other suitable diameter. Exemplary ultra-bendable optical fibers are ClearCurve® optical fibers, commercially available from Corning Incorporated.

The fiber alignment body 12 includes a first fiber alignment member 22 and a second fiber alignment member 24. The fiber alignment members 22 and 24 may be formed of any suitable materials such as metals and/or plastics. The first fiber alignment member 22 includes a proximal end 26 that forms part of the larger dimension portion 14 of the fiber alignment body 12 and a distal end 28 that forms part of the smaller dimension portion 16 of the fiber alignment body 12. Extending between the proximal end 26 and the distal end 28 is a first guide channel surface 32 that forms part of a continuous optical fiber guide channel 34 that is sized to receive one or more of the optical fibers 30. The second fiber alignment member 24 includes a proximal end 36 that forms part of the larger dimension portion 14 of the fiber alignment body 12 and a distal end 38 that forms part of the smaller dimension portion 16 of the fiber alignment body 12. Extending between the proximal end 36 and the distal end 38 is a second guide channel surface 40 that forms part of the optical fiber guide channel 34 that is sized to receive one or more of the optical fibers 30.

Figure 4:
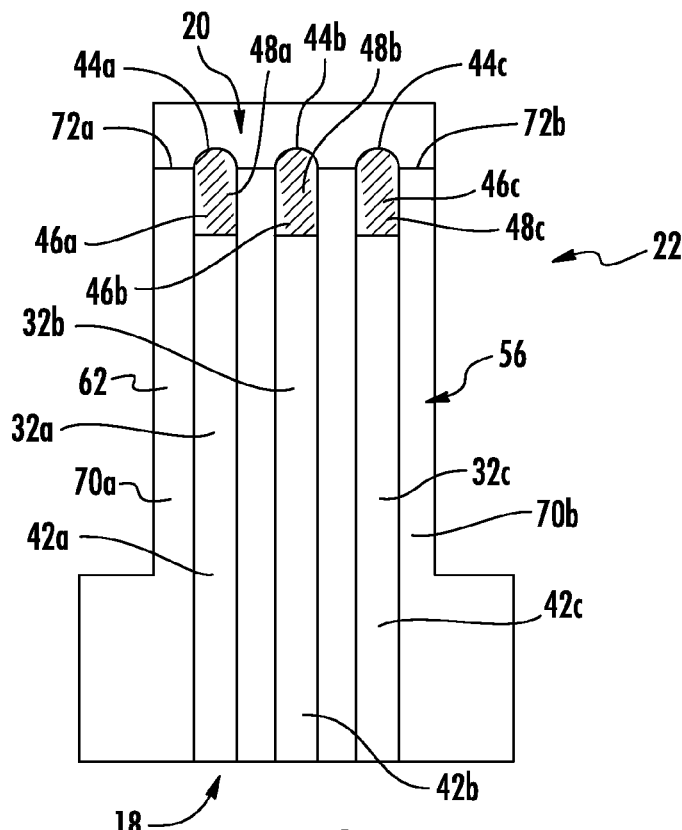
FIG. 4 is a bottom view of an embodiment of a fiber alignment member.

Referring to FIG. 4, the first fiber alignment member 22 may include multiple first guide channel surfaces 32*a*, 32*b* and 32*c* that form multiple, discrete fiber optic guide channels 34 (FIG. 3) depending, for example, on the number of optical fibers 30 carried by the optical fiber connector 10. Each of the guide channel surfaces 32*a*, 32*b* and 32*c* may be formed as recesses that extend into the first fiber alignment member 22 as U-shaped (or any other suitable shape) recesses. The guide channel surfaces 32*a*, 32*b* and 32*c* include a lead-in channel portion 42*a*, 42*b* and 42*c* that extends from the first I/O end 18, a lead-out channel portion 44*a*, 44*b* and 44*c* that extends to the second I/O end 20 and a turn portion 46*a*, 46*b* and 46*c* that connects the lead-in channel portion 42*a*, 42*b* and 42*c* and the lead-out channel portion 44*a*, 44*b* and 44*c* thereby forming continuous half channels that extend between the first I/O end 18 to the second I/O end 20. As will be described in greater detail below, the turn portions 46*a*, 46*b* and 46*c* may each be provided with a reflective surface 48*a*, 48*b* and 48*c* that can receive light from the optical fibers 30 to reflect or otherwise redirect the light from the lead-in channel portions 42*a*, 42*b* and 42*c* to the lead-out channel portions 44*a*, 44*b* and 44*c*.

Figure 5:
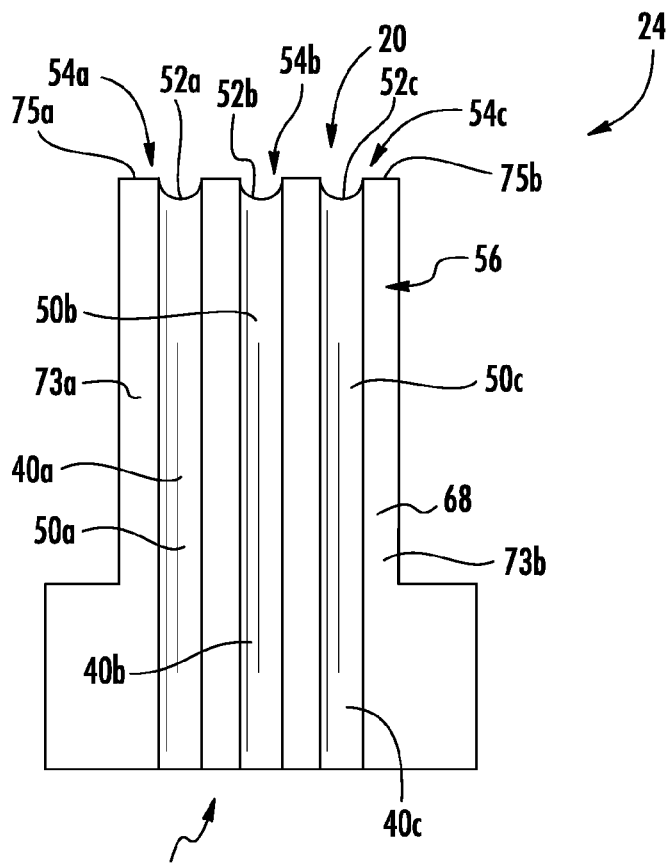
FIG. 5 is a top view of an embodiment of a fiber alignment member.

Referring to FIG. 5, the second fiber alignment member 24 may include multiple second guide channel surfaces 40*a*, 40*b* and 40*c* that form multiple, discrete fiber optic guide channels 34 (FIG. 3). Each of the guide channel surfaces 40*a*, 40*b* and 40*c* may be formed as recesses that extend into the second fiber alignment member 24 as U-shaped (or any other suitable shape) recesses. The guide channel surfaces 40*a*, 40*b* and 40*c* include a lead-in channel portion 50*a*, 50*b* and 50*c* that extends from the first I/O end 18, a lead-out channel portion 52*a*, 52*b* and 52*c* that extends to the second I/O end 20 and a turn portion 54*a*, 54*b* and 54*c* that connects the lead-in channel portion 50*a*, 50*b* and 50*c* and the lead-out channel portion 52*a*, 52*b* and 52*c* thereby forming continuous half channels that extend between the first I/O end 18 to the second I/O end 20.

Referring to FIG. 1 and also FIGS. 4 and 5, the first fiber alignment member 22 and the second fiber alignment member 24 are formed to mate along a parting region 56, the outermost edge of which defines a parting line 58 (FIG. 1) that extends continuously about a periphery 60 of the fiber alignment body 12. Referring particularly to FIG. 4, the first fiber alignment member 22 has a parting surface 62 that is formed as a flat ledge that extends continuously about a portion of the first guide channel surfaces 32*a*, 32*b* and 32*c*. The parting surface 62 has lead-in portions 70*a* and 70*b* and lead-out portions 72*a* and 72*b* that extend transverse to the lead-in portions 70*a* and 70*b* to coextend with at least a portion of the fiber optic guide channels 34. For example, the lead-in portions 70*a* and 70*b* coextend with the lead-in channel portions 42 of the guide channel surfaces 32 and the lead-out portions 72a and 72b coextend with the lead-out channel portions 52 of the guide channel surfaces 32.

Referring to FIG. 5, the second fiber alignment member 24 has a parting surface 68 that is formed as a flat ledge that extends continuously about a portion of the second guide channel surfaces 40a, 40b and 40c. The parting surface 68 has lead-in portions 73a and 73b and lead-out portions 75a and 75b that extend transverse to the lead-in portions 73a and 73b to coextend with at least a portion of the fiber optic guide channels 34. For example, the lead-in portions 73a and 73b coextend with the lead-in channel portions 50 of the guide channel surfaces 40 and the lead-out portions 75a and 75b coextend with the lead-out channel portions 52 of the guide channel surfaces 40.

FIG. 1 and also 3 illustrate the first fiber alignment member 22 and the second fiber alignment member 24 assembled together to form the fiber alignment body 12. When assembled, the parting surface 62 of the first fiber alignment member 22 aligns with the parting surface 68 of the second fiber alignment member 24 thereby forming the parting region 56 that extends about the periphery of the fiber alignment body 12 and intersects the optical fiber guide channels 34. The parting line 58 is formed by the outermost edge of the parting region 56.

As can be seen most clearly by FIG. 3, the first guide channel surfaces 32a, 32b and 32c cooperate with the second guide channel surfaces 40a, 40b and 40c to form the optical fiber guide channels 34. In particular, the lead-in channel portions 42a, 42b and 42c of the first guide channel surfaces 32a, 32b and 32c cooperate with the lead-in channel portions 50a, 50b and 50c of the second guide channel surfaces 40a, 40b and 40c to form lead-in channel portions 74 of the optical fiber guide channels 34. The lead-out channel portions 44a, 44b and 44c of the first guide channel surfaces 32a, 32b and 32c cooperate with the lead-out channel portions 52a, 52b and 52c of the second guide channel surfaces 40a, 40b and 40c to form lead-out channel portions 76 of the optical fiber guide channels 34. The turn portions 46a, 46b and 46c of the first guide channel surfaces 32a, 32b and 32c cooperate with the turn portions 54a, 54b and 54c of the second guide channel surfaces 40a, 40b and 40c to form turn portions 78 of the optical fiber guide channels 34. It should be noted that while each guide channel 34 is illustrated having one optical fiber 30, one or more of the guide channels 34 may have multiple optical fibers 30 extending lengthwise through the guide channels 34.

Referring again to FIG. 1, the first fiber alignment member 22 and the second fiber alignment member 24 may be connected together using any suitable method. For example, a weld may be formed along the parting line 58, holding the upper and second fiber alignment members 22 and 24 together. The weld (represented by the parting line 58) may be formed using lasers, ultrasonic energy, arc welding, etc. and the weld may be continuous (i.e., being continuous along the entire length of the parting line 58) or the weld may be intermittent or discontinuous (i.e., may be applied only a selected locations along the length of the parting line 58). Crimp bands or other fastening devices may be used to connect the first fiber alignment member 22 and the second fiber alignment member 24 together. The first fiber alignment member 22 and the second fiber alignment member 24 may be releasably or permanently connected together. Releasably connecting the upper and second fiber alignment members 22 and 24 together may facilitate insertion, adjustment, replacement and removal of the optical fibers 30 within the fiber alignment body 12.

Figure 6:
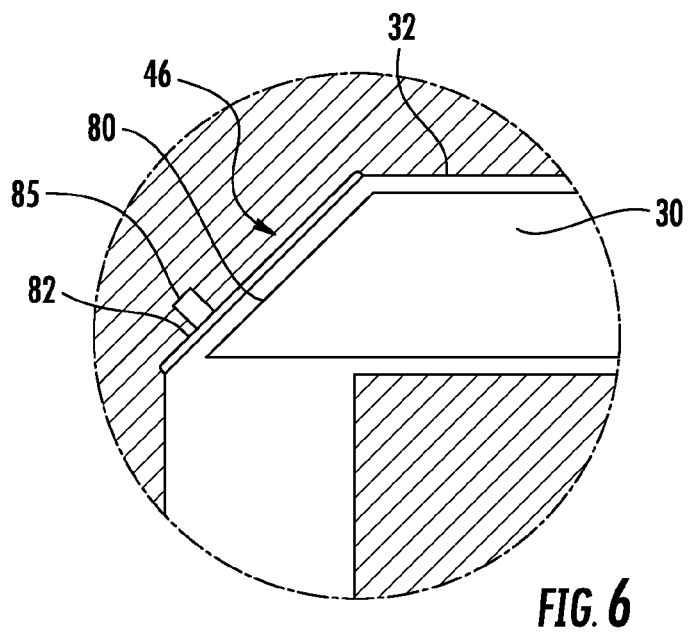
FIG. 6 is a detail view of area 6 of FIG. 3.

Referring to FIG. 6, the optical fibers 30 may include an end 80 that faces the turn portion 46 of the respective first guide channel surface 32. Located at the turn portion 46 is a reflective surface 82. As illustrated by FIG. 6, the reflective surface 82 may be oriented at an angle to horizontal, such as between about 15 and about 85 degrees, such as between about 25 and about 75 degrees, such as between about 35 and about 55 degrees, such as about 45 degrees to horizontal. In some embodiments, the reflective surface 82 may be substantially planar or some other shaped such as curved or parabolic. The reflective surface 82 may be formed of any material suitable for reflecting light, such a metal like polished titanium, copper or other suitable material (e.g., optical coatings) deposited on or attached to the turn portion 46 of the first guide channel surface 32. The reflectivity of the reflective surface 82 may be wavelength dependent. While the reflective surface 82 may be a separate piece of reflective material (or optically coated material to be reflective), the reflective surface 82 may be formed by the material forming the fiber alignment material 22 or coated onto the material forming the fiber alignment member 22.

While, in some embodiments, it may be desirable to have as much incident light reflected by the reflective surface 82 as possible, there may be some percentage of light that is not reflected. As one example, the reflective surface 82 may behave similar to a splitter and may be formed of a material (including use of optical coatings) that allows some light to transmit through the reflective surface 82. As another example, the reflective surface 82 may include an aperture that is sized and located to allow an amount of light by the reflective surface 82. In such embodiments, it may be possible to monitor the light being reflected by the reflective surface 82. For example, a photodetector 85, such as a photodiode may be used to measure or detect an amount of light transmitting through the reflective surface 82 by converting the light to a voltage and measuring the voltage. Any suitable ratios of incident light to reflected light may be used, such as ranges close to or greater than 1:1.

Figure 7:
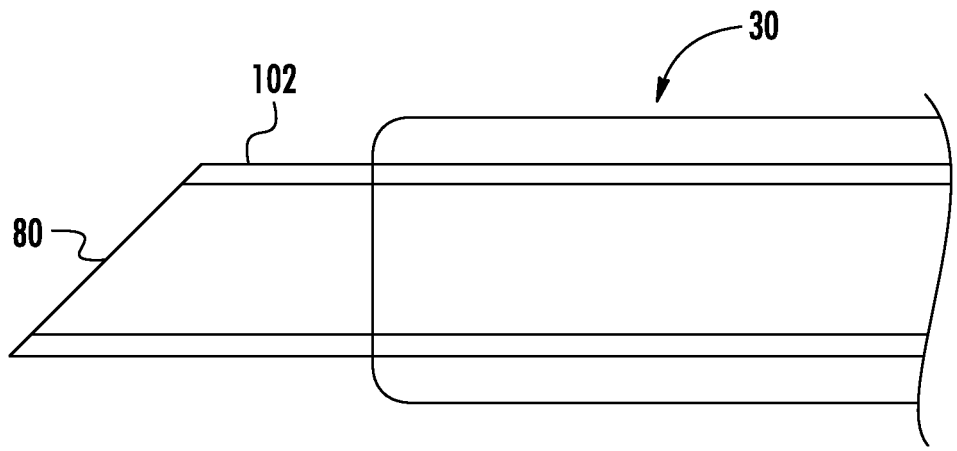
FIG. 7 is a side view of an embodiment of an optical fiber for use with the optical connector of FIG. 1.

Referring to FIG. 7, the end 80 of the optical fiber 30 may be laser cut to an angle that is similar to or the same as the reflective surface 82. This allows the end 80 of the optical fiber 30 to be positioned near the reflective surface 82 and minimizes any gap and resultant losses between the end 80 and the reflective surface 82.

Figure 8:
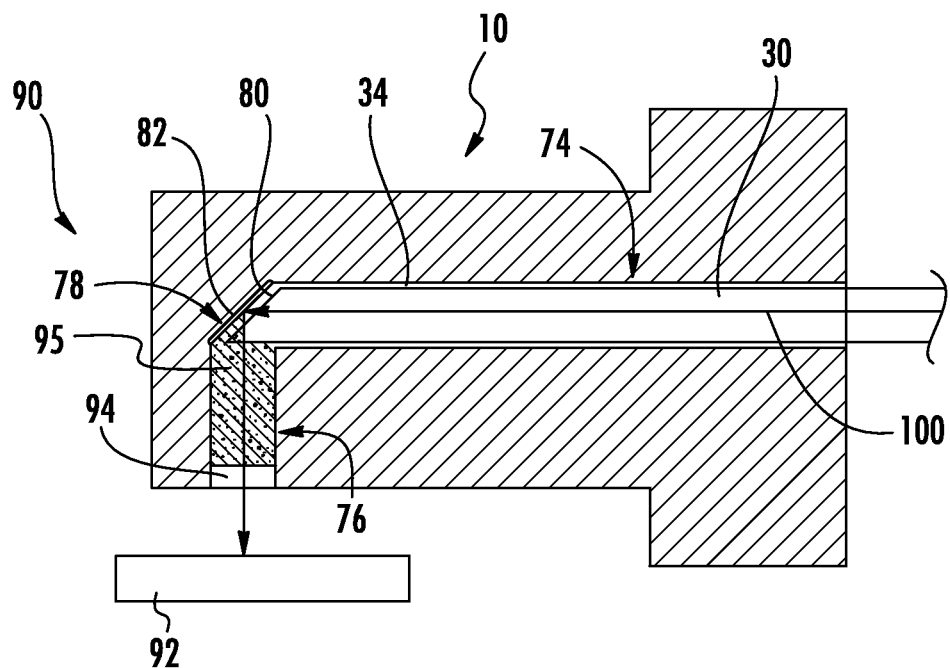
FIG. 8 is a schematic diagram of an embodiment of an opto-electric assembly that includes the optical fiber connector of FIG. 1.

FIG. 8 illustrates a schematic diagram of an opto-electric assembly 90 that includes the optical fiber connector 10. Opto-electronic assembly 90 includes an opto-electronic device 92, such as an optical transmitter (e.g., an optical transmitter array, broad-area emitter, etc.) or an optical detector (e.g., an optical detector array, broad-area detector, vertical-cavity surface-emitting laser (VCSEL), LED, etc.). As one example, a microlens 94 may be used to facilitate optical coupling to opto-electronic device 92. The microlens 94 can be configured to allow for increasing separation between optical fiber connector 10 and the opto-electronic device 92.

In operation, light 100 travels through the optical fiber 30, through the lead-in channel portion 74 of the optical fiber guide channels 34 and exits the optical fiber 30 through the end 80. The light 100 is received by the reflective surface 82 within the turn portions 78 of the optical fiber guide channels 34 and is reflected in a direction that is different from the direction the light 100 is received (e.g., a 90 degree turn). In some embodiments, due at least in part to the angles of the reflective surface 82 and end 80 of the optical fiber 30 and the proximity of the end 80 to the reflective surface 82, the light 100, after reflecting from the reflective surface 82, may pass back through at least a portion of the optical fiber 30, toward the lead-out channel portion 76 of the optical fiber guide channels 34. This is because the position of the end 80 of the optical fiber 30, which is stripped of its jacket, extends over at least a portion of the lead-out channel portion 76 of the optical fiber guide channels 34 and is located within the travel path of the light 100. In some embodiments, cladding 102 (FIG. 7) of the optical fiber 30 may be, itself, used to alter or help focus and/or steer the light 100 after reflecting off the reflective surface 82. For example, the cladding 102 may be glass or other optical material that could have an altered index profile to lens the reflected or incident light 100. Glass, as a cladding example, may include a dopant (e.g., chlorine or boron) that can be used to change physical or optical properties of the cladding 102, such as viscosity. The light 100 then travels through the lead-out channel portion 76 to the microlens 94. In some embodiments, an index matching material 95 (e.g., fluids, gels, oils, etc.) may be applied within the lead-out channel portion 76 (or other locations within the optical fiber guide channels 34, such as the lead-in channel portion 74 and/or the turn portion 78) to serve as a bridge for the light 100. The microlens 94 can inhibit dust and other particles from entering the lead-out channel portion 76 of the optical fiber guide channel 34. The microlens 94 may or may not alter the light 94. For example, a window may be used to protect the lead-out channel portion 76 of the optical fiber guide channel 34 without altering (e.g., narrowing or spreading) the light 100. In some embodiments, the cladding 102 may behave as a lens 94 for directing the light 100.

The opto-electronic device 90 may include a broad arean optical detector, which like a VCSEL, implemented using planar fabrication processes. Also like a VCSEL, the detector active area can be optimized to provide low-loss fiber-to-detector coupling as well as high device data rates. The planar process enables 1D or 2D layouts and co-location of detector amplification circuitry for high-speed device operation.

It is noted that the cross-sectional views of optical fiber connector 10 presented herein depict a 1-dimensional array of one or more fibers 10 by way of illustration. Two-dimensional or more arrays are also contemplated. Such embodiments may be formed, for example, by providing at least one alignment member and/or spacer (e.g., divider member) to offset each 1-D row of fibers 30 from neighboring rows. A 2-D array pattern may include non-regular fiber waveguide pitches or 2-D patterns with some amount of skew to maximize optical coupling with the opto-electronic device 90.

Figure 9:
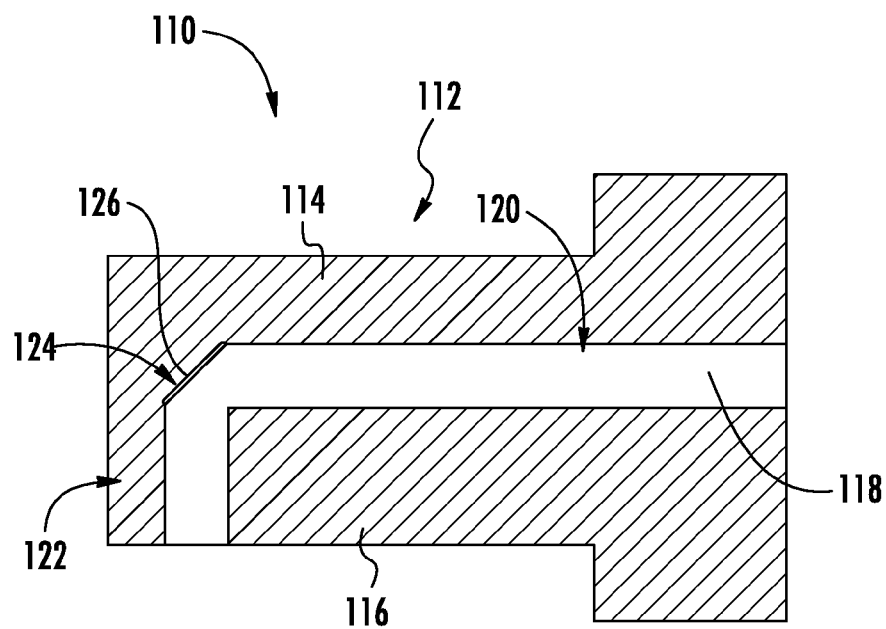
FIG. 9 illustrates another embodiment of an optical fiber connector.
Figures 10, 11:
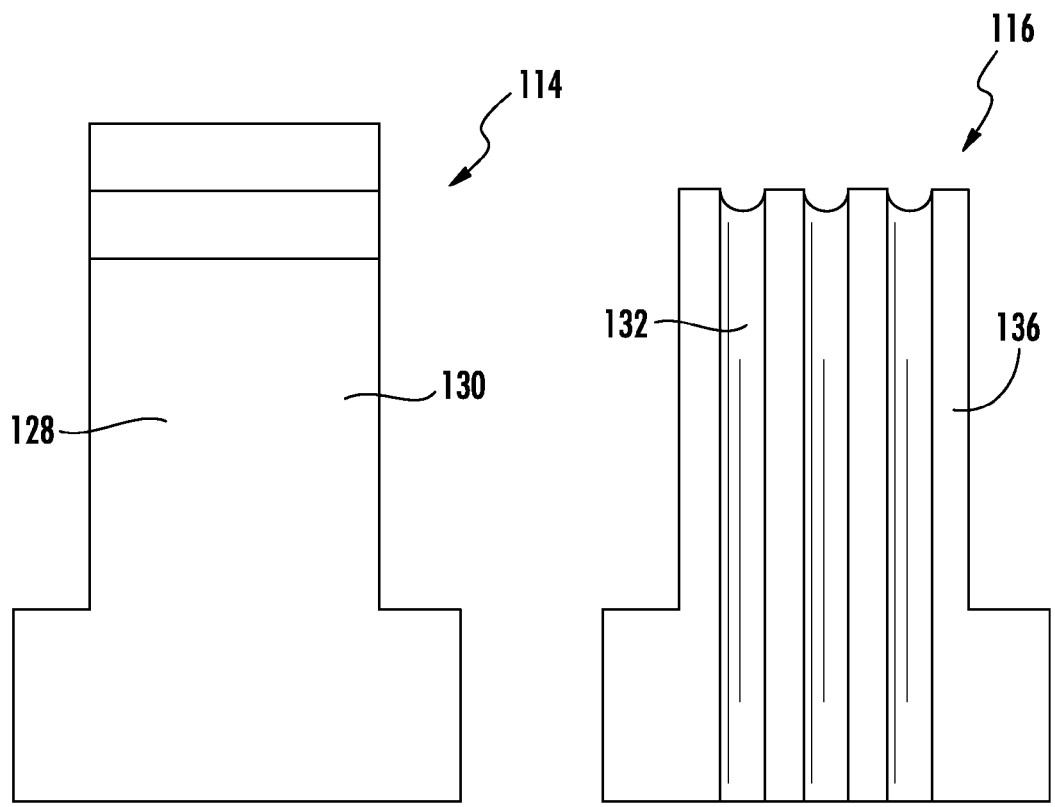
FIG. 10 is a bottom view of another embodiment of a fiber alignment member.
FIG. 11 is a top view of another embodiment of a fiber alignment member.

Referring to FIG. 9, another embodiment of an optical fiber connector 110 includes many of the features described above including a fiber alignment body 112 formed by a first fiber alignment member 114, a second fiber alignment member 116 and an optical fiber guide channel 118 formed therebetween having a lead-in channel portion 120, a lead-out channel portion 122 and a turn portion 124 that connects the lead-in channel portion 120 and the lead-out channel portion 122. As above, a reflective surface 126 is provided at the turn portion 124 for reflecting or redirecting light traveling from the lead-in channel portion 120 to the lead-out channel portion 122. Referring to FIGS. 10 and 11, however, in this embodiment, the first guide channel surfaces 128 are formed by a flat or planar bottom surface 130 of the first fiber alignment member 114 with U-shaped second guide channel surfaces 132 formed only within the second fiber alignment member 116. In other embodiments, the U-shaped guide channel surfaces may be formed in only the first fiber alignment member 114 and an upper surface 136 of the second fiber alignment member 116 may form the second guide channel surfaces.

Figure 12:
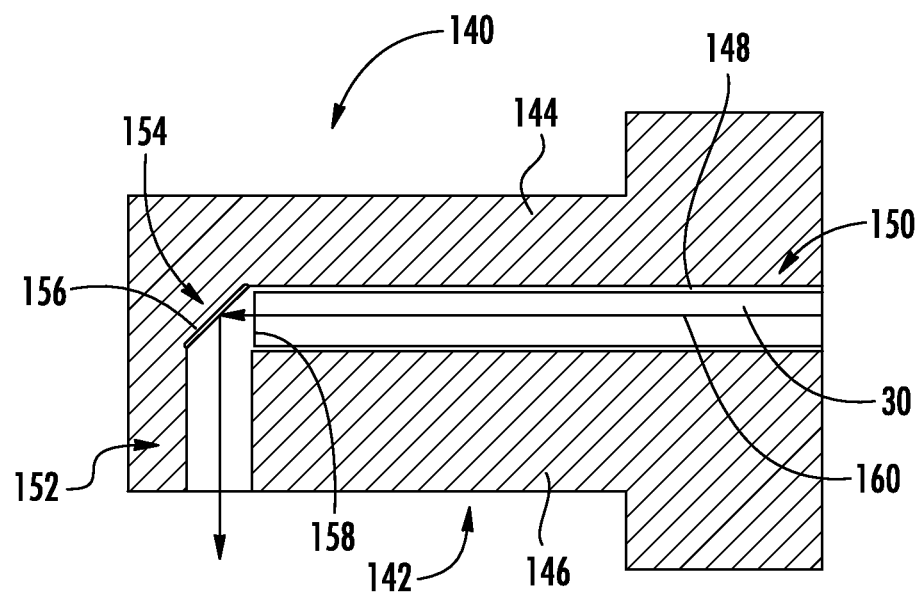
FIG. 12 illustrates another embodiment of an optical fiber connector.

Referring now to FIG. 12, another embodiment of an optical fiber connector 140 includes many of the features described above including a fiber alignment body 142 formed by a first fiber alignment member 144, a second fiber alignment member 146 and an optical fiber guide channel 148 formed therebetween having a lead-in channel portion 150, a lead-out channel portion 152 and a turn portion 154 that connects the lead-in channel portion 150 and the lead-out channel portion 152. A reflective surface 156 is provided at the turn portion 154 for reflecting or redirecting light traveling from the lead-in channel portion 150 to the lead-out channel portion 152. In this embodiment, an optical fiber 30 is located within the lead-in channel portion 150 that terminates at an end 158 that is spaced from the reflective surface 156. Unlike the end 80 of the optical fiber 30 of FIG. 8, the end 158 may be square or in a plane perpendicular to a longitudinal axis of the optical fiber 30.

In operation, light 160 travels through the optical fiber 30, through the lead-in channel portion 150 of the optical fiber guide channel 148 and exits the optical fiber 30 through the end 158. The light 160 is received by the reflective surface 156 within the turn portion 154 of the optical fiber guide channel 148 and is reflected in a direction that is different from the direction the light 160 is received (e.g., a 90 degree turn). In some embodiments, due to the end 158 of the optical fiber 30 being located spaced from the reflective surface 156, the light 160, after reflecting from the reflective surface 82, may pass by the end 158 of the optical fiber 30 without re-entering the optical fiber 30, toward the lead-out channel portion 152 of the optical fiber guide channel 148. The end 158 may be located a predetermined distance from the reflective surface 156. For example, the end 158 may be located within the lead-in channel portion 150 or within the turn portion 154.

Figure 13:
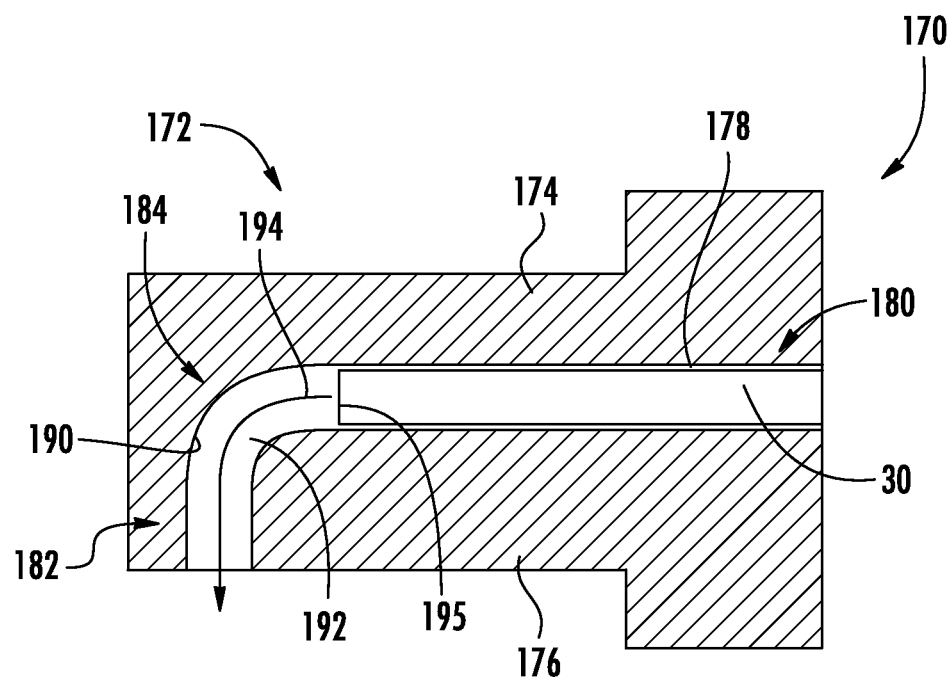
FIG. 13 illustrates another embodiment of an optical fiber connector.

Referring to FIG. 13, another embodiment of an optical fiber connector 170 includes many of the features described above including a fiber alignment body 172 formed by a first fiber alignment member 174, a second fiber alignment member 176 and an optical fiber guide channel 178 formed therebetween having a lead-in channel portion 180, a lead-out channel portion 182 and a turn portion 184 that connects the lead-in channel portion 180 and the lead-out channel portion 182. In this embodiment, first guide channel surface 186 and/or second guide channel surface 188 may be coated or otherwise covered with a reflective surface 190 thereby forming a light tube 192 for transporting light 194 from the optical fiber 30 located in the lead-in channel portion 180, through the turn portion 184 and to the lead out channel portion 182. In this embodiment, as above, the optical fiber 30 may terminate at an end 194 that is located in the lead-in channel portion 180 or the turn portion 184.

Figure 14:
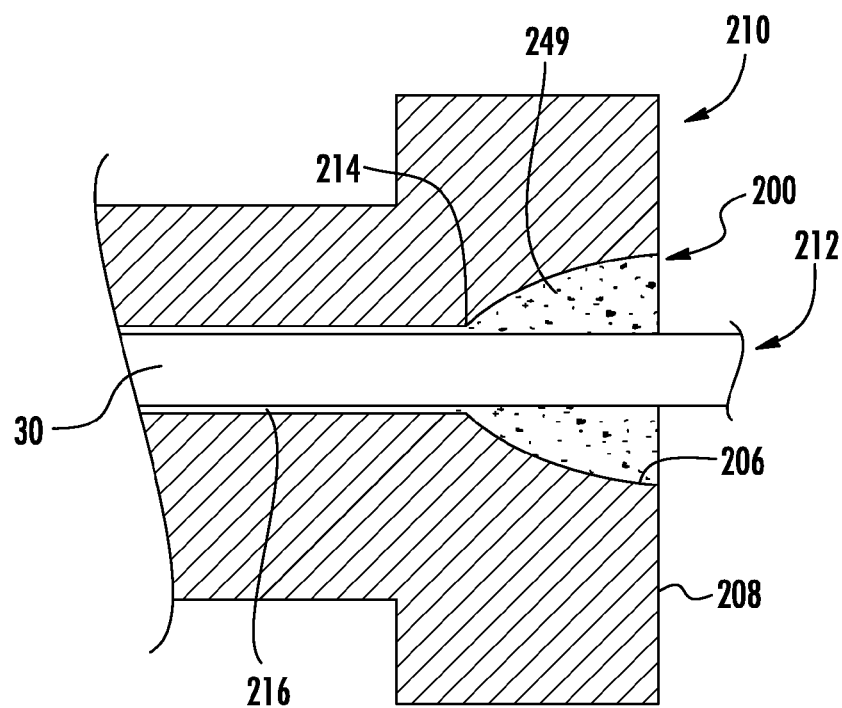
FIGS. 14-16 illustrate various exemplary lead-in structures for receiving optical fibers.
Figure 15:
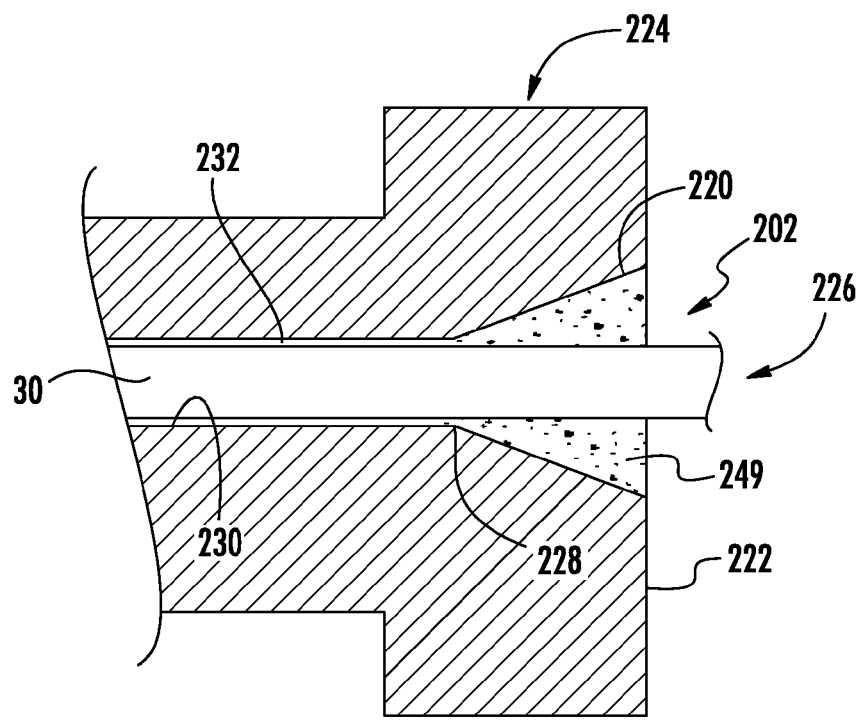
Figure 16:
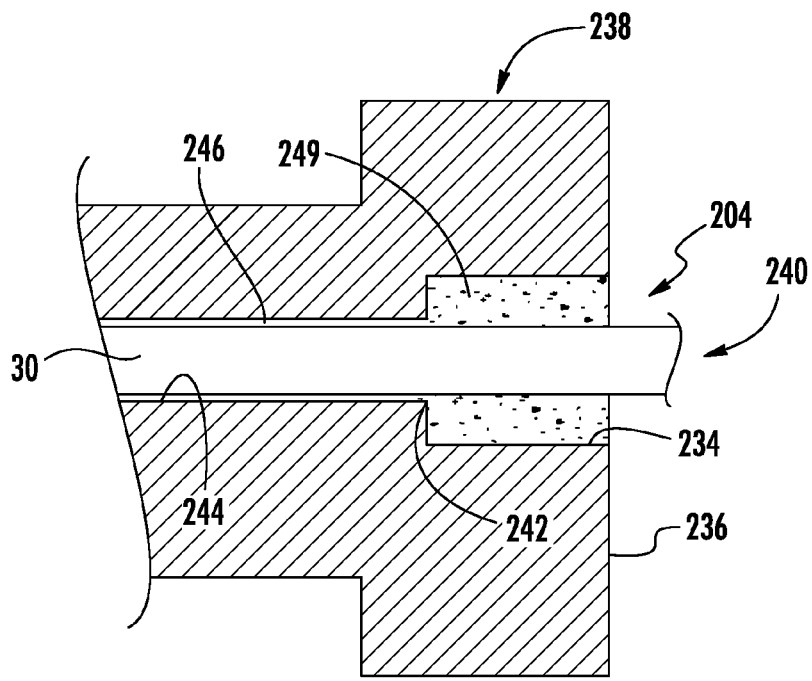
Figure 17:
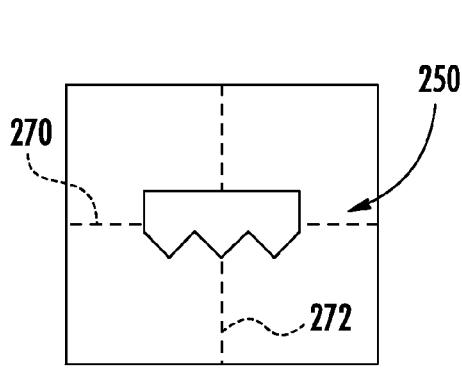
FIGS. 17-20 illustrate various exemplary opening portions for the lead-in structures of FIGS. 14-16.
Figure 18:
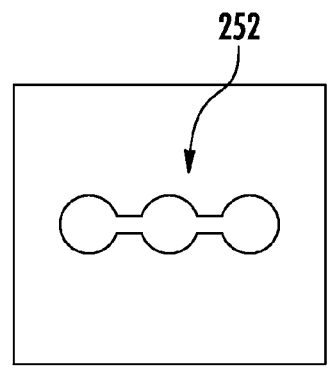
Figure 19:
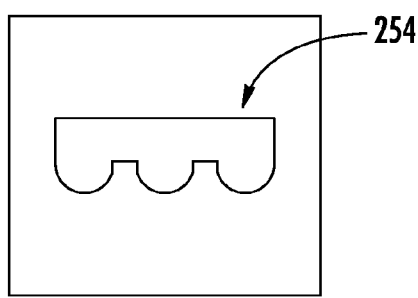
Figure 20:
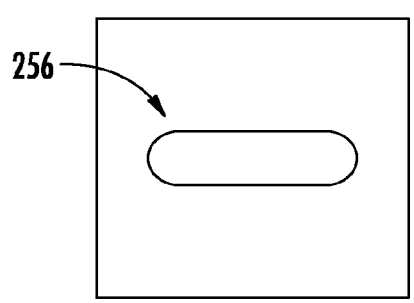
Figure 21:
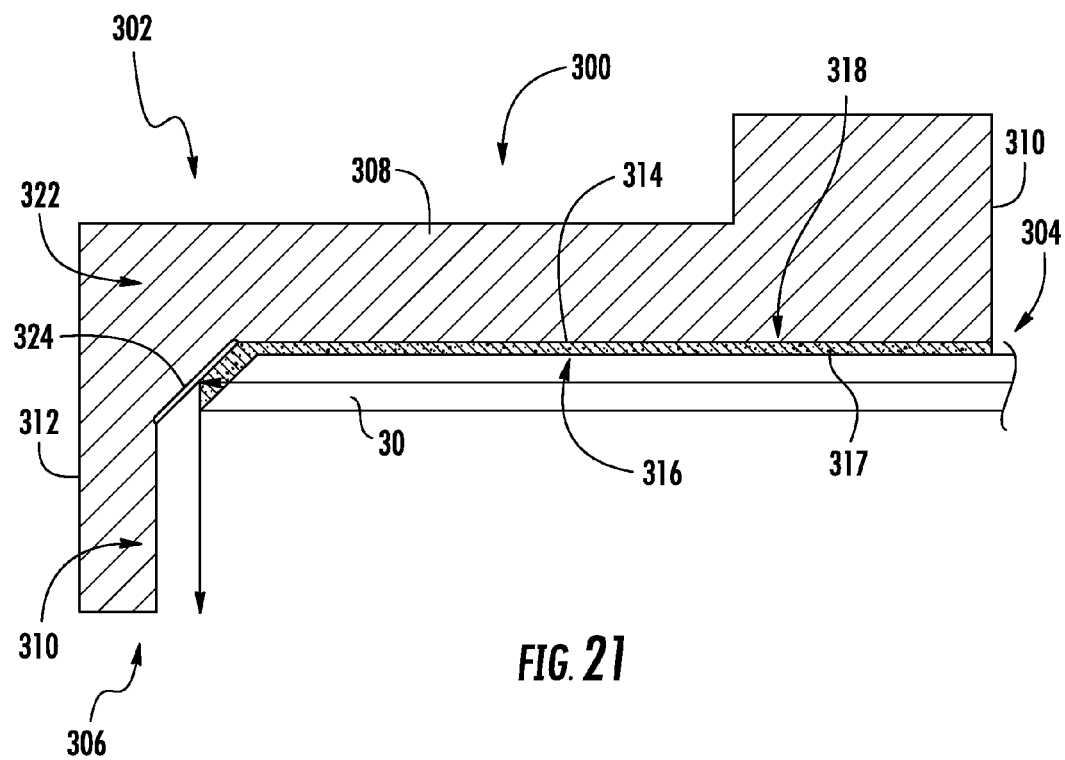
FIG. 21 is a side section view of another embodiment of an optical fiber connector.

Referring to FIGS. 14-16, various lead-in structures 200, 202 and 204 are illustrated for receiving the optical fiber 30. Referring first to FIG. 14, the lead-in structure 200 may be a somewhat curved, parabolic shape having an opening portion 206 at an end surface 208 of fiber alignment body 210 at the first I/O end 212 that is larger in dimension and tapers down to an exit portion 214 that is in communication with a lead-in channel portion 216 of optical fiber guide channel 218. Referring to FIG. 15, the lead-in structure 202 may be a somewhat conical shape having an opening portion 220 at an end surface 222 of fiber alignment body 224 at the first I/O end 226 that is larger in dimension and tapers down to an exit portion 228 that is in communication with a lead-in channel portion 230 of optical fiber guide channel 232. Referring to FIG. 16, the lead-in structure 204 may be a somewhat box-like shape having an opening portion 234 at an end surface 236 of fiber alignment body 238 at the first I/O end 240 that is larger in dimension and tapers down to an exit portion 242 that is in communication with a lead-in channel portion 244 of optical fiber guide channel 246. The lead-in structures 200, 202 and 204 may be filled with an epoxy or other adhesive to secure the optical fiber 30 at a desired location within the optical fiber guide channel. FIGS. 17-20, various exemplary opening portions 250, 252, 254 and 256 are illustrated for the lead-in structures 200, 202 and 204. Any suitable lead-in structure and opening portion shapes may be used for securing and retaining the optical fibers 30. Additionally, the parting line may extend or be oriented horizontally and/or vertically as illustrated by dotted lines 270 and 272 in any of the above described embodiments Referring to FIG. 21, another embodiment of an optical fiber connector 300 includes a fiber alignment body 302 having a first input I/O end 304 and a second I/O end 306 that lie in substantially orthogonal planes. The fiber alignment body 302 includes a fiber alignment member 308 that is similar to the first fiber alignment member 22 of, for example, FIG. 3. In this embodiment, however, the fiber alignment body 302 includes a single fiber alignment member 308 (e.g., as opposed to multiple fiber alignment members 22 and 24 illustrated by FIG. 3).

The fiber alignment member 308 includes a proximal end 310 and a distal end 312. Extending between the proximal end 310 and the distal end 312 is a guide channel surface 314 that forms part of a continuous optical fiber guide channel 316 that is sized to receive one or more of the optical fibers 30, which may be held within the continuous optical fiber guide channel 316 using any suitable method, such as an optical adhesive 317 The fiber alignment member 308 may include multiple first guide channel surfaces 314 that form multiple, discrete fiber optic guide channels 34 (FIG. 3) depending, for example, on the number of optical fibers 30 carried by the optical fiber connector 300. Each of the guide channel surfaces 314 may be formed as recesses that extend into the fiber alignment member 308 and may include a lead-in channel portion 318 that extends from the first I/O end 304, a lead-out channel portion 320 that extends to the second I/O end 306 and a turn portion 322 that connects the lead-in channel portion 318 and the lead-out channel portion 320 thereby forming the continuous channels 316 that extend between the first I/O end 304 to the second I/O end 306. As above, the turn portion 322 may be provided with a reflective surface 324 that can receive light from the optical fiber 30 to reflect or otherwise redirect the light from the lead-in channel portion 318 to the lead-out channel portion 320.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An optical fiber connector comprising:
a fiber alignment body including an optical fiber guide channel extending therethrough, the optical fiber guide channel having a lead-in channel portion, a lead-out channel portion and a turn portion that connects the lead-in channel portion and the lead-out channel portion, the fiber alignment body having a reflective surface formed of metal that receives light traveling from an optical fiber located within the lead-in channel portion of the optical fiber guide channel and reflects the light into the lead-out channel portion of the optical fiber guide channel, wherein:
the fiber alignment body comprises:
a first fiber alignment member comprising a lead-in channel portion and a lead out channel portion, wherein the lead-in channel portion of the first fiber alignment member is transverse to the lead-out portion of the first fiber alignment member: and
a second fiber alignment member comprising a lead-in channel portion and a lead out channel portion, wherein the lead-in channel portion of the second fiber alignment member is transverse to the lead-out portion of the second fiber alignment member; and
the first fiber alignment member is connected to the second fiber alignment member such that the lead-in channel portion of the first fiber alignment member and the lead-in channel portion of the second fiber alignment member cooperate to form the lead-in channel portion of the optical fiber guide channel, and the lead-out channel portion of the first fiber alignment member and the lead-out channel portion of the second fiber alignment member cooperate to form the lead-out channel portion of the optical fiber guide channel, and the first fiber alignment member and the second fiber alignment member meet along a parting region that intersects the optical fiber guide channel.

2. The optical fiber connector of claim 1, wherein the reflective surface is a predetermined shape selected to reflect the light from the optical fiber into the lead-out channel portion of the optical fiber guide channel.

3. The optical fiber connector of claim 2, wherein the reflective surface is planar or parabolic in shape.

4. The optical fiber connector of claim 1, wherein the first fiber alignment member comprises a lead-in channel surface, a lead-out channel surface and the reflective surface that extends at an obtuse angle to the lead-in channel surface.

5. The optical fiber connector of claim 1, wherein the parting region intersects each of the lead-in channel portion, the lead-out channel portion and the turn portion of the optical fiber guide channel.

6. The optical fiber connector of claim 1, wherein the reflective surface is at the turn portion of the optical fiber guide channel.

7. The optical fiber connector of claim 1 further comprising an optical fiber located in the lead-in channel portion of the optical fiber guide channel.

8. The optical fiber connector of claim 7, wherein the optical fiber has an end face that faces the reflective surface.

9. The optical fiber connector of claim 7, wherein the optical fiber includes a cladding comprising an optical material through which light passes after reflecting from the reflective surface.

10. The optical fiber of claim 1, wherein the reflective surface allows a portion of the light to transmit by the reflective surface.

11. The optical fiber of claim 10 further comprising a photodetector that detects an amount of light transmitting by the reflective surface.

12. The optical fiber connector of claim 1, further comprising an index-matching material within the lead-out channel portion of the optical fiber guide channel.

13. The optical fiber connector of claim 1, further comprising a microlens within the lead-out channel portion of the optical fiber guide channel.

14. An optical fiber connector comprising:
a first fiber alignment member having a lead-in channel surface, a lead-out channel surface and a reflective surface that extends at an angle to the lead-in channel surface such that the lead-in channel surface of the first fiber alignment member is transverse to the lead-out channel surface of the first fiber alignment member; and
a second fiber alignment member that includes a lead-in channel surface and a lead out channel surface such that the lead-in channel surface of the second fiber alignment member is transverse to the lead-out channel surface of the second fiber alignment member;
wherein the first fiber alignment member is connected to the second fiber alignment member along a parting region such that the lead-in channel surface of the first fiber alignment member and the lead-in channel surface of the second fiber alignment member cooperate to form a lead-in channel portion of an optical fiber guide channel and the lead-out channel surface of the first fiber alignment member and the lead-out channel surface of the second fiber alignment member cooperate to form a lead-out channel portion of the optical fiber guide channel, and wherein the parting region intersects each of the lead-in channel portion, the lead-out channel portion and a turn portion of the optical fiber guide channel.

15. The optical fiber connector of claim 14, wherein the first fiber alignment member is connected to the second fiber alignment member by a weld extending along the parting region.

16. The optical fiber connector of claim 14, wherein the reflective surface is at the turn portion of the optical fiber guide channel.

17. The optical fiber connector of claim 14, further comprising an index-matching material within the lead-out channel portion of the optical fiber guide channel.

18. The optical fiber connector of claim 14, further comprising a microlens within the lead-out channel portion of the optical fiber guide channel.

\* \* \* \* \*